April 13, 1937.　　　W. E. BARRIE　　　2,077,202
MILKING PAD
Filed Nov. 9, 1935
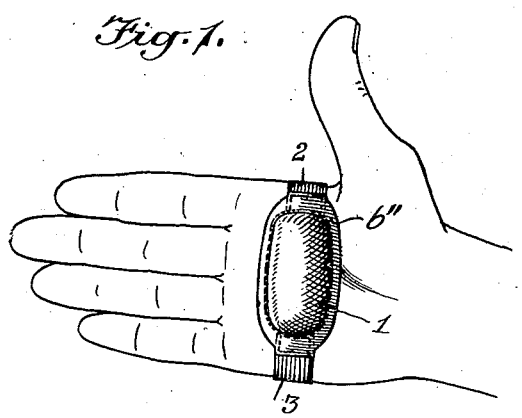
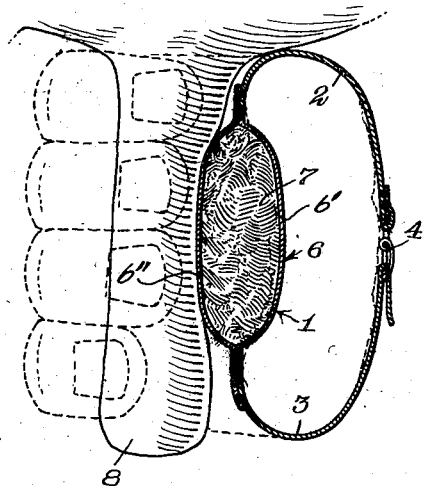
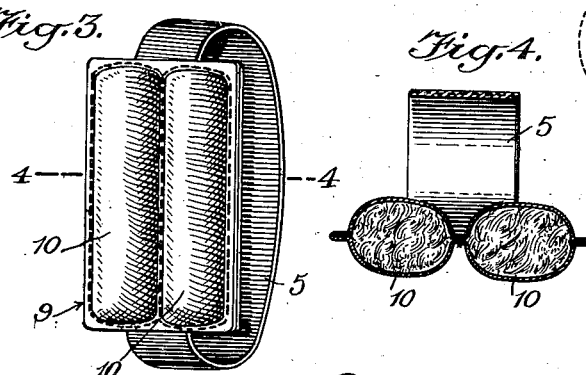
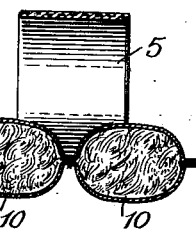
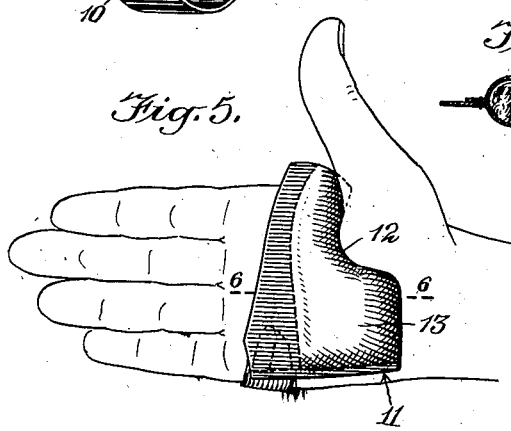
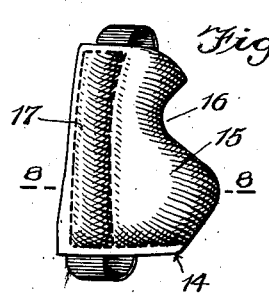
WITNESSES
INVENTOR
William E. Barrie
BY
ATTORNEYS Patented Apr. 13, 1937

2,077,202

UNITED STATES PATENT OFFICE 2,077,202

MILKING PAD

William E. Barrie, East Corinth, Vt.

Application November 9, 1935, Serial No. 49,091

3 Claims. (Cl. 31—80)

This invention relates to a milking apparatus and particularly to an improved pad to be used in the hands of a person milking a cow, the object being to provide a structure which will permit the hand to function more easily and more efficiently.

Another object of the invention is to provide a pad for the hands for milking purposes wherein the parts are formed and positioned to fill the concave or depressed portion of the palm of the hand so that a better pressure may be secured during the milking operation.

A further object and more specifically is to provide a milking pad for the hand of the person milking, the pad being adapted to be formed as an elongated structure round in cross-section and provided with one, two or more protuberances either with or without a notched formation for accommodating the thumb.

In the accompanying drawing—

Figure 1 is an elevation of a milking pad disclosing an embodiment of the invention, the same being shown applied to the hand;

Figure 2 is a sectional view through the pad shown in Figure 1, the same being shown in connection with the dug or teat of a cow's udder and illustrating how the same functions;

Figure 3 is a perspective view of a modified form of pad to that shown in Figure 1;

Figure 4 is a sectional view through Figure 3 approximately on line 4—4;

Figure 5 is a view similar to Figure 1 but showing a modified form of pad structure;

Figure 6 is a fragmentary sectional view through Figure 5 on line 6—6;

Figure 7 is a perspective view of a slightly modified form of pad as shown in Figure 5;

Figure 8 is a fragmentary sectional view through Figure 7 on line 8—8.

In the dairy industry, it is necessary to milk cows regularly and much of this milking is done by hand. In hand milking, a certain action of the hand must take place in order to produce a desired milking action and this action of the hand includes a squeezing of the dug of the cow, which become tiresome after the milking operation has been carried on for some time. In order to reduce the tiring effect of milking as much as possible and to secure a quick action the improved pad illustrated in the accompanying drawing may be utilized without injuring the cow or the person doing the milking. As shown in the accompanying drawing, 1 indicates a pad which is provided with any kind of means for removably securing the same to the hand of the operator. As shown in the drawing, there are provided straps 2 and 3 which are connected with pad 1 and these pads have a buckle 4 for adjustably connecting them together. It will be understood that an elastic might be used as indicated by 5 in Figure 3 or other forms of fastening means without departing from the spirit and scope of the invention. The pad 1 is a sack 6 made of material such as leather or fabric and in this sack there is arranged a filling 7 of wool, cotton, rubber, or other desired material which will be more or less yielding but amply firm to secure a desired pressure against the dug 8 when the device is in use. As shown in the drawing, the pad 1 is elongated and almost elliptical, but if desired it could be made round or other shape without departing from the spirit of the invention. It will also be noted that straps 2 and 3 merge into a centrally positioned widened portion 6' to which is stitched a coacting bottom member or part 6'' to complete the sack 6.

As illustrated in Figure 3, the pad 9 is formed with two pad sections 10 and 11.

In Figures 5 and 6 further forms of the invention are shown wherein the pad 11 is provided with a notch 12 for accommodating a part of the thumb and thickened portion 13 of the pad is set back toward the wrist further than the pad 1 as shown in Figure 1. This is to cause the pad to conform to the particular hand. It is well known that hands of different persons are formed somewhat differently and these differences must be taken into consideration when using a pad of the kind described during a milking operation. It is therefore intended to have large and small pads and pads with either notches or without notches so as to accommodate children or grown persons and hands of different contours.

In Figures 7 and 8, a further slight modified form of the invention wherein a pad 14 is provided with a thickened or padded portion 15 having a notch 16 and a narrow raised portion 17 on the side of the pad opposite the thumb. It will be understood that not only the invention may be embodied in the various pads as shown in Figure 1, but may be embodied in many different specific contours without departing from the spirit of the invention. It will also be understood that the pad or pads could be made out of rubber or any other desired material that will hold air and which may be inflated. If desired, the pads could be originally filled with air or gas and sealed, or an air valve could be added and the pads inflated to a desired extent by an ordinary air pump.

I claim:

1. A milking pad comprising a retaining strap merging at its center into a widened portion, a bottom portion coacting with said widened portion to form a sack, and a filling for said sack, said filling and sack being elongated and almost elliptical in form.

2. A milking pad comprising a hollow leather body having an outer enclosure of sack formation and a yielding filling therefor, said body being of a size to fit into the palm of the hand, said body being formed with top and bottom members, said top member merging into a pair of strap extensions for disengageably mounting the body on the hand, and a buckle carried by said extensions for permitting adjustment of the extensions.

3. A milking pad comprising a retaining strap formed with a widened central part and a pair of strap extensions, a buckle for adjustably securing the free ends of said extensions together, a bottom member, stitching for connecting said bottom member to said widened part, and a filling positioned between said bottom member and said enlarged central part.

WILLIAM E. BARRIE.